(No Model.) 2 Sheets—Sheet 1.
J. W. EISENHART.
LET-OFF AND TAKE-UP MECHANISM FOR LOOMS.
No. 448,327. Patented Mar. 17, 1891.
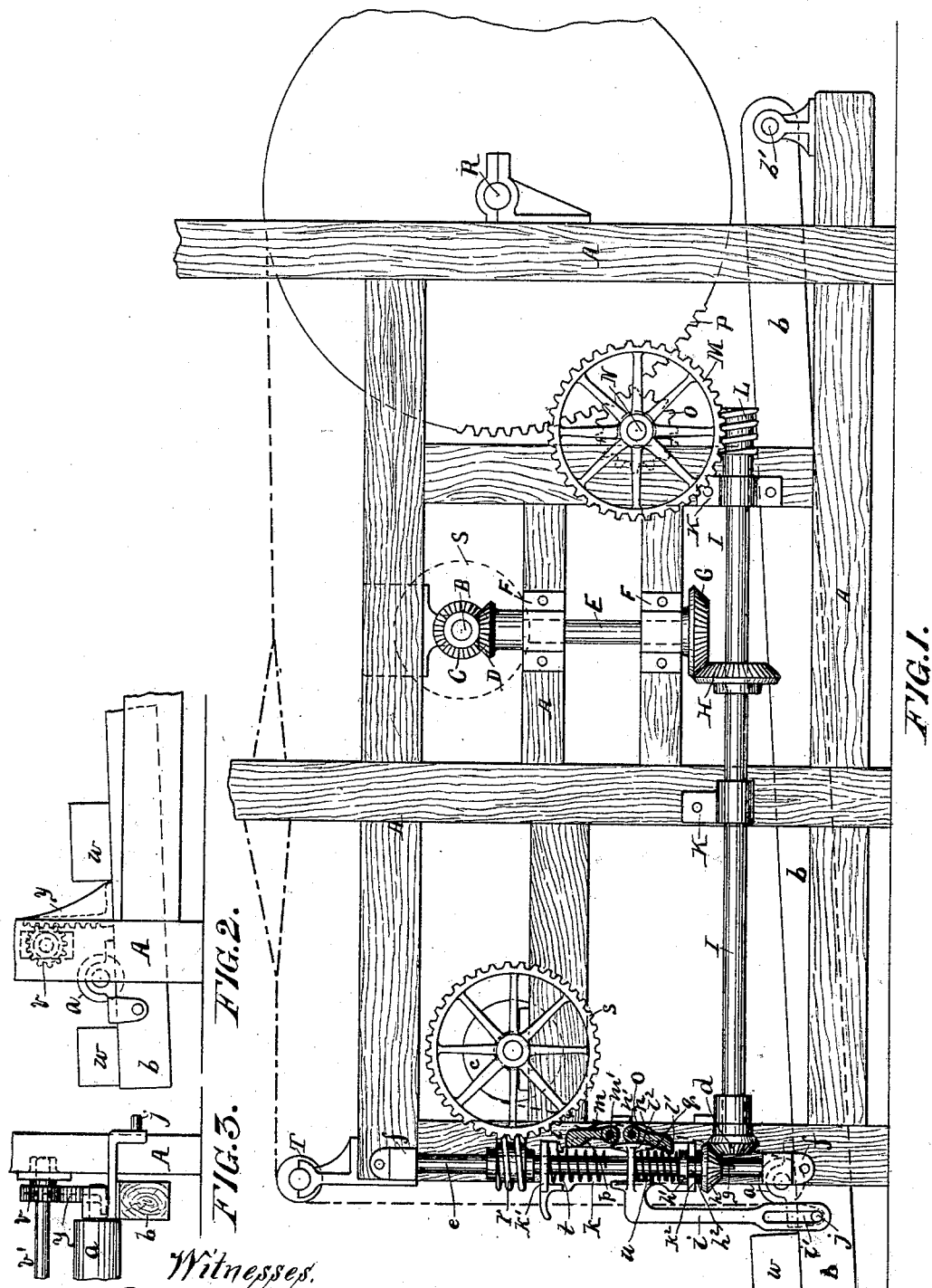
Witnesses
Frank Williams
F. G. Sellers
Inventor
John W. Eisenhart
by his attorney
Chas. A. Rutter.

(No Model.) 2 Sheets—Sheet 2.
J. W. EISENHART.
LET-OFF AND TAKE-UP MECHANISM FOR LOOMS.
No. 448,327. Patented Mar. 17, 1891.
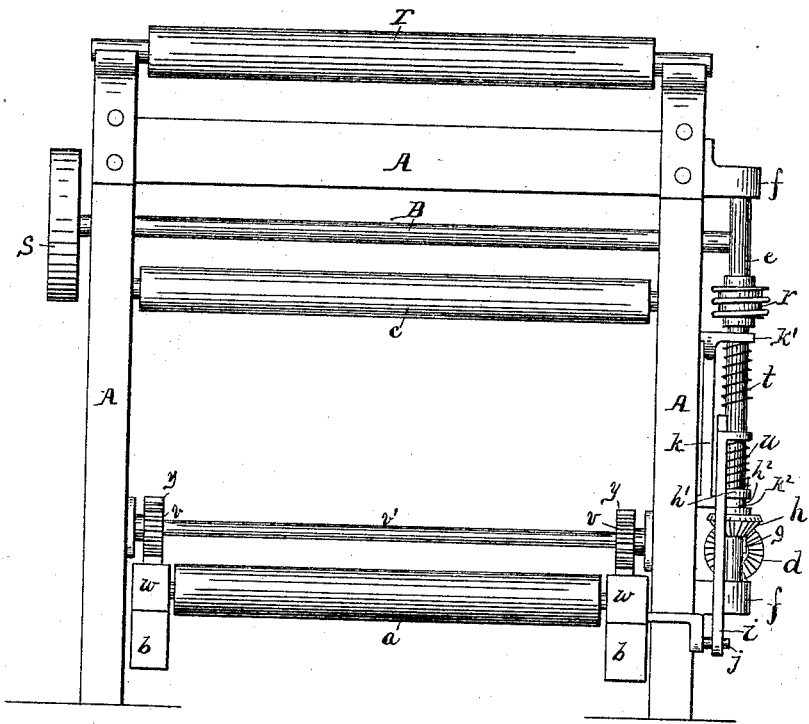
FIG. 4.
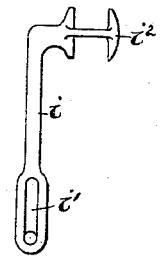
FIG. 5.
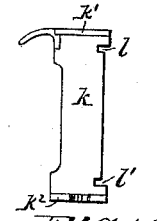
FIG. 7.
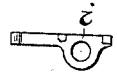
FIG. 6.
FIG. 8.
WITNESSES:
Frank Williams
F. G. Sellers
INVENTOR
John W. Eisenhart
by his attorney
Chas. A. Rutter

United States Patent Office.

JOHN W. EISENHART, OF YORK, PENNSYLVANIA.

LET-OFF AND TAKE-UP MECHANISM FOR LOOMS.

SPECIFICATION forming part of Letters Patent No. 448,327, dated March 17, 1891.

Application filed July 8, 1890. Serial No. 358,085. (No model.)

*To all whom it may concern:*

Be it known that I, JOHN W. EISENHART, a citizen of the United States, and a resident of York, in the county of York and State of Pennsylvania, have invented certain new and useful Improvements in Let-Off and Take-Up Mechanism for Looms, of which the following is a specification.

My invention relates in general to improvements in take-up and let-off mechanism for looms, but more particularly to improvements in this class of mechanism as applied to looms for weaving wire-cloth; and it consists in the arrangement and combination of parts, as fully described hereinafter.

In the accompanying drawings, forming part of this specification, and in which similar letters of reference indicate similar parts throughout the several views, Figure 1 is a side elevation of part of a wire-cloth loom, showing my take-up and let-off mechanism; Fig. 2, a side elevation of part of the gravitating frame and part of the loom-frame, showing device for causing the gravitating frame to always carrying the cloth-roller $a$ in a horizontal position; Fig. 3, a front view of Fig. 2; Fig. 4, a front view of Fig. 1; Figs. 5 and 6, a side elevation and plan of lever for throwing the pawls which hold ratchet-plate in its elevated and depressed positions, and Figs. 7 and 8 a side elevation and plan of ratchet-plate.

A is the frame of the loom, and B the main driving-shaft. Upon this shaft is placed a bevel-gear C, which meshes with and drives a bevel-gear D, Fig. 1, upon one end of a vertical shaft E, which is carried by suitable bearings F, held by the frame A. Upon the lower end of shaft E is placed a bevel-gear G, which meshes with and drives a bevel-gear H upon a horizontal shaft I, which revolves in suitable bearings K, carried by the frame A. Upon the rear end of shaft I is a worm L, which meshes with and drives a worm-wheel M, carried by a shaft N, which revolves in suitable bearings carried by frame A. Upon shaft N is a gear-wheel O, which meshes with and drives a gear-wheel P, which is carried by a shaft R, which also carries the warp-beam. The motion is given to shaft B by a pulley S, (shown by dotted lines in Fig. 1 and by full lines in Fig. 4,) and is transmitted through the mechanism shown to unwind the warp from the warp-beam.

The take-up mechanism is constructed and operates as follows: The finished cloth passes over a roller T and down in front of the loom under a roller $a$, which is carried by the gravitating frame $b$, then up to the cloth-beam C. $e$ is a vertical shaft secured by and free to revolve in suitable bearings $f$, carried by the frame A. Near the lower end of this shaft and secured to it by a feather $g$ is a bevel-wheel $h$, which is intermittingly thrown into and out of gear with a bevel-wheel $d$, carried by the forward end of shaft I. $i$, Figs. 1, 4, 5, and 6, is a lever, the lower end of which is furnished with a slot $i'$, through which a pin $j$ passes, which is carried by the gravitating frame $b$. The upper end of lever $i$ is bent inward and the shaft $e$ passes through it, and upon the inside of this upper end is a cam $i^2$. $k$, Figs. 1, 4, 7, and 8, is a plate, the upper part of which is furnished with a projection $k'$, through which shaft $e$ passes, and the lower part of which is furnished with a bifurcated projection $k^2$, which grasps a turned-out groove $h^2$ in the hub $h'$ of the bevel-gear $h$. Near the upper and lower ends of plate $k$ are notches $l$ $l'$, with which pawls $m$ $n$ can engage. These pawls $m$ $n$ are pivoted to the frame A of the loom at $m'$ $n'$, and $o$ is a spring which always tends to throw them into the notches $l$ $l'$ in the plate $k$. The pawls $m$ $n$ are furnished with cams $p$ $q$, against which the cam $i^2$ on the lever $i$ bears in order to lift these pawls out of the notches $l$ $l'$ in plate $k$, as described hereinafter. Upon shaft $e$ is a worm $r$, which is fast to this shaft and which meshes with and drives a worm-wheel $s$, which drives the cloth-beam. The gravitating frame $b$ is pivoted at its rear end to a shaft or stud $b'$, and upon its forward end it carries a weight or weights $w$. Surrounding shaft $e$ is a spring $t$, the upper end of which is held by the projection $k'$ of plate $k$, and surrounding this shaft $e$ is another spring $u$, which rests upon the hub $h'$ of bevel-wheel $h$.

In describing the operation of the take-up movement we will consider the bevel-wheels $h$ and $d$ to be out of gear and the gravitating frame $b$ to be descending. The pawl $n$ is now engaged with the notch $l'$ in plate $k$ and holds this plate in its raised position, while the lower bifurcated projecting end $k^2$ of this plate holds bevel-gear $h$ out of gear with bevel-gear $d$. As the outer end of gravitating frame $b$ descends by its own weight, aided by weights $w$, it draws down by means of pin $j$ the lever $i$, which now compresses the spring $u$, one end of which bears against the upper part of this lever and the other against the hub of bevel-gear $h$. As the gravitating frame and lever $i$ descend farther, the cam $i^2$ on the inside upper end of lever $i$ engages pawl $n$ and throws this pawl out of the notch $l'$ in plate $k$, and the spring $u$ immediately throws the bevel-gear $h$ into gear with bevel-wheel $d$ and at the same time lowers the plate $k$ until pawl $m$ engages notch $l$ in the upper end of this plate. The revolution of wheel $h$ causes shaft $e$ and worm $r$ to be turned, which revolves worm-wheel $s$, which turns the cloth-beam $c$, which takes up the cloth. As the cloth is taken up, it passes around roller $a$ and raises this roller, and with it the gravitating frame. During the raising of the gravitating frame the lever $i$ and its connected parts remain stationary until the pin $j$ reaches the upper end of slot $i'$ in lever $i$, when it raises this lever, which then ascends and presently compresses spring $t$, after which the cam $i^2$ engages pawl $m$ and lifts it out of notch $l$, when spring $t$ raises plate $k$ and with it gear-wheel $h$, and pawl $n$ engages notch $l'$ in plate $k$ and holds gear-wheel $h$ out of gear until the gravitating frame again descends.

In order that the roller $a$ may always keep its horizontal position, I place upon the side frames A of the loom (see Figs. 2, 3, and 4) a spur-wheel $v$, one upon each side of the loom, and upon each side of the gravitating frame I bolt fast a rack Y, which is adapted to engage with wheels $v$. The wheels $v$ are pinned and connected by a shaft $v'$, and these wheels and the racks Y effectually prevent either end of the roller $a$ from being raised or lowered before the other.

Having thus described my invention, I claim as new and desire to secure by Letters Patent—

1. The combination, in a loom, of the main driving-shaft, a bevel-gear on this shaft, a vertical shaft, a bevel-gear on the upper part of this shaft gearing into and driven by bevel-gear on main driving-shaft, a bevel-gear on lower part of said vertical shaft, a horizontal shaft, a bevel-gear on this shaft gearing into and driven by bevel-gear on lower part of vertical shaft, a bevel-gear upon front end of horizontal shaft, a vertical shaft $e$, a bevel-gear secured to this shaft by a feather and adapted to engage with bevel-gear on front end of horizontal shaft, a worm on said vertical shaft, a worm-wheel gearing into and driven by said worm and driving the cloth-beam, a gravitating frame, a roller carried by said gravitating frame, a lever $i$, through the upper part of which shaft $e$ passes and which is furnished with a pawl-operating cam, and the lower end of which is slotted and through which slot a pin on gravitating frame passes, a plate with projections at the top and bottom, through the former of which shaft $e$ passes and the latter adapted to grasp a turned-out groove on the hub of bevel-gear on shaft $e$, springs surrounding shaft $e$ and adapted to bear against projections at top and bottom of plate and against upper part of lever $i$, and pawls pivoted to frame of loom and adapted to engage alternately notches at top and bottom of plate, all arranged and operating substantially as and for the purposes set forth.

2. In a let-off motion for a loom, the combination of a driving-shaft furnished with a bevel-gear, a vertical shaft furnished with a bevel-gear gearing into said bevel-gear on said driving-shaft and with a bevel-gear gearing into a bevel-gear on a horizontal shaft, said horizontal shaft, a worm on said horizontal shaft gearing into and driving a worm-wheel on a horizontal shaft or stud, a pinion on said shaft or stud, and a gear-wheel upon the warp-beam shaft gearing into said pinion, all substantially as described.

3. The herein-described device for throwing bevel-gear $h$ into and out of gear with bevel-gear $d$ and for stopping and starting the driving of shaft $e$ and the cloth-beam, and, in combination with said bevel-gears $h$ and $d$, shaft $e$, worm $r$, worm-wheel $s$, cloth-beam, and the gravitating frame, a lever through the upper end of which shaft $e$ passes and which is operated by the gravitating frame, as described, and which is furnished with a pawl-operating cam at its upper end, a plate the upper end of which surrounds and is guided by shaft $e$ and the lower end of which is bifurcated and clasps hub of bevel-gear $h$ and is furnished with notches near its upper and lower ends, pawls pivoted to the loom-frame and adapted to engage with said notches to hold said plate up or down and the bevel-gears out of or in gear, and springs for throwing said plate either up or down, as the movements of the lever and pawls may dictate.

4. In combination with the cloth-beam of a loom and as a device for stopping and starting the driving of the cloth-beam, a horizontal shaft the forward end of which is furnished with a bevel-gear, means for driving this shaft, as described, a vertical shaft furnished with a bevel-gear secured to it by a feather and adapted to engage with bevel-gear on said horizontal shaft, a gravitating frame, a lever through the upper end of which said vertical shaft passes and which carries a pawl-actuating cam, and the lower end of which is furnished with a slot in which a pin carried by gravitating frame works, a plate furnished with notches near its upper and lower ends, and the upper end of which surrounds the vertical shaft and the lower end of which is bifurcated and grasps the hub of bevel-wheel on this shaft, the springs surrounding this shaft and adapted to throw plate either up or down when the pawls are released, the pawls pivoted to the frame of the loom and adapted to engage with notches in the upper and lower ends of plate, the worm on said shaft, worm-wheel on cloth-beam engaging with said worm, and a roller on said gravitating frame under which the cloth passes on its way to the cloth-beam, all arranged and operating substantially as set forth.

JOHN W. EISENHART.

Witnesses:
JOHN A. HOOBER.
J. B. DAILEY.